United States Patent [19]
Radha

[11] Patent Number: 6,154,496
[45] Date of Patent: Nov. 28, 2000

[54] VIDEO BUFFER FOR SEAMLESS SPLICING OF MPEG STREAMS

[75] Inventor: Hayder Radha, Mahwah, N.J.

[73] Assignee: Philips Electronics N.A. Corp., New York, N.Y.

[21] Appl. No.: 08/977,989

[22] Filed: Nov. 25, 1997

[51] Int. Cl.⁷ ........................................................ H04N 7/12
[52] U.S. Cl. ........................................................ 375/240.28
[58] Field of Search .................................. 348/845.3, 845, 348/419; 375/240.26, 240.28; H04N 7/12

[56] References Cited

U.S. PATENT DOCUMENTS 5,982,436  11/1999  Balakrishnan et al. .................. 348/409

OTHER PUBLICATIONS

Information Technology–generic coding of moving pictures an dassociated audio information Systems, ISO/IEC 13818–1, pp. 119, 1996E.

*Primary Examiner*—Young Lee

[57] ABSTRACT

At a seamless splice point, a stream of frames from alternate encoders can be switched to a decoder without causing visually disturbing artifacts, and without causing the decoder's buffer to underflow or overflow. Each encoder's buffer is constrained to lie within an upper and lower bound so as to preclude the underflow or overflow of the decoder buffer, regardless of whether the encoder's stream is switched into or out of the stream to the decoder. By classifying splice points as Entry-only splice points or Exit-only splice points, it is shown that the encoder upper and lower bounds may be relaxed. Furthermore, it is shown that by the appropriate choice of transfer rates for Entry-only and Exit-only points, the permissible size of frames before and after the splice point can be regulated.

14 Claims, 5 Drawing Sheets

VIDEO BUFFER FOR SEAMLESS SPLICING OF MPEG STREAMS

This invention was made with United States Government support under Cooperative Agreement No. 70NANBH1174 awarded by the National Insititute For Standards and Technology (NIST). The United States Government has certain rights in the invention.

BACKGROUND OF THE INVENTION

1. Field of the Invention

This invention relates to a method and apparatus for communicating MPEG images from an encoder to a decoder, and in particular to the management of the encoder buffer to provide efficient data transfer while also precluding an overflow or underflow of the decoding buffer. Of specific interest is the management of the encoder buffer in the region of an MPEG Splice Point, a point in the stream of images at which an alternative encoder or decoder may be switched into the stream without introducing visually disturbing artifacts.

2. Description of Related Art

The MPEG standard defines a data format for the encoding of sequential video images in a compressed format, with sufficient timing information to allow for these images to be decoded and presented for viewing in the same order, and at the same rate, as the original, unencoded visual images. The sequential video images are comprised of frames, each frame typically being encoded at fixed intervals of time, and subsequently decoded and displayed at the same fixed interval of time, but delayed in time relative to the time of encoding.

In the art, the term "field" is also used to refer to each sequentially encoded image, often with regard to images intended to be displayed in an interlaced form. Similarly, the term "picture" is also used to refer to each encoded image. For simplicity, the term "frame" is used generically herein to refer to each encoded image. Similarly, the term MPEG is used generically herein, referring both to the formal data format specification, as well as the existing body of knowledge derived from this specification and its implementation, known to those skilled in the art.

Each MPEG frame may differ in size, each having a degree of compression dependent upon the image content and the content of other frames. To effect a constant encode and decode rate with varying sized frames, data buffers are provided at the encoder and at the decoder. Images are encoded into frames at a fixed frame rate and stored in the encoder buffer; the bits comprising the frames are communicated from the encoder buffer to the decoder buffer at a bit rate which is substantially independent of the frame rate, and usually constant; and the frames are unloaded from the decoder buffer at the fixed frame rate. The number of bits which a buffer can hold at any one time is termed the buffer size; the number of bits which a buffer is actually holding at a given time is termed the buffer occupancy. The use of buffers to allow variable sized frames to be transmitted continually and subsequently decoded at a constant frame rate provides for an optimized information transfer.

If the occupancy of the encoder is controlled to within specified encoder bounds, it can be shown that the occupancy of the decoder will necessarily be within a given set of decoder bounds. To preclude an underflow or overflow at the decoder, the decoder occupancy must remain within the bounds of zero and the decoder buffer size (Bd), respectively. The encoder bounds required to assure these decoder bounds are:

$$EUB(t) = \int_{\tau=t}^{\tau+\Delta} r(\tau) d(\tau) \quad (1)$$

and $$ELB(t) = EUB(t) - Bd \quad (2)$$

where EUB(t) is the upper bound of the encoder buffer occupancy, and ELB(t) is the lower bound of the encoder buffer occupancy, at time t. Delta ($\Delta$) is the time between the encoding of a frame and its subsequent decoding, and, to maintain a constant display rate, is constant for a given encoder-decoder system. The transfer rate, r, may be variable or constant. For a constant transfer rate system having a transfer rate R, $EUB(t) = R\Delta$, and $ELB(t) = R\Delta - Bd$. These bounds 201, 202 are shown in FIG. 2. As each frame is encoded, the size of the encoding is either zero filled or truncated so that the resultant encoder buffer occupancy lies within these bounds.

Note that these bounds are not specific to MPEG. MPEG is used herein to refer to a particular standard utilized to communicate a series of video images. As will be evident to one skilled in the art, however, the principles and techniques discussed herein are applicable to the switching of streams of any format via a system comprising an encoder and decoder, each having a buffer. Similarly, although the examples contained herein refer to frames of video images, the principles and techniques discussed herein are equally applicable to frames of audio passages, data packets, and the like.

The MPEG standard defines Seamless Splice Points, wherein the input to a decoder may be switched from a stream of frames from one encoder to a stream of frames from another encoder without introducing visual artifacts, such as incomplete frames, in the decoded image. The standard also requires that underflow and overflow of the decoder buffer is precluded, independent of whether the switch actually occurs. That is, the encoder buffer bounds must be such that, regardless of whether this encoder's stream continues or another encoder's stream is switched in, the decoder buffer will not overflow or underflow.

Figure 1:
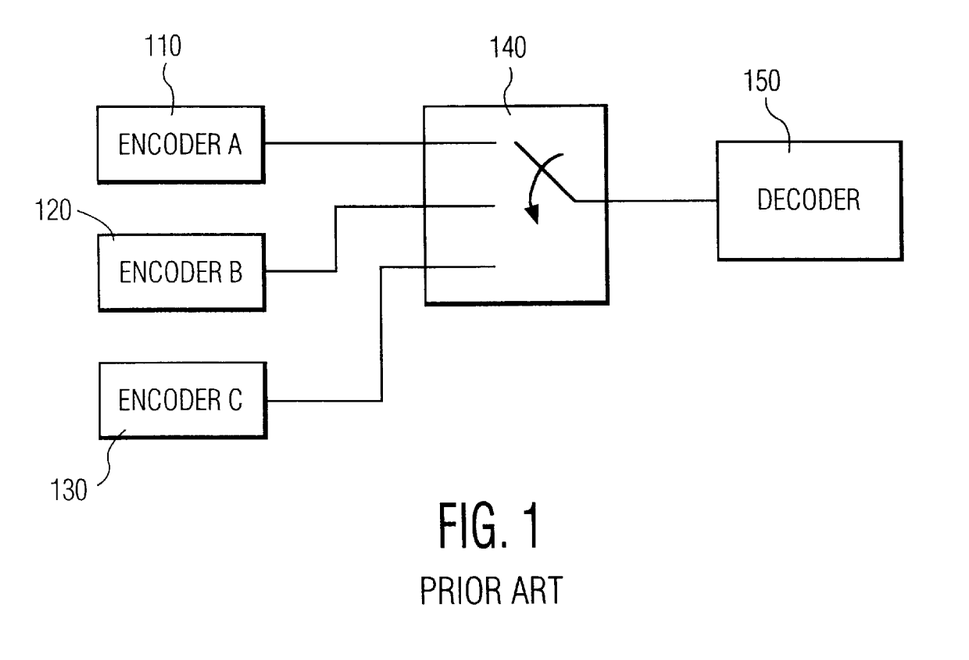
FIG. 1 shows a communications system comprising a decoder, multiple encoders, and a switch for selecting the source encoder to the decoder.

FIG. 1 shows a communications system comprising a decoder 150, and multiple encoders 110, 120, 130. Switch 140 selects one of the encoders to be connected to the decoder 150, thereby providing a source encoder of the subsequent stream of frames to the decoder. Each MPEG stream contains a suitable marking of the points in the stream whereat the switch 140 may effect the selection or deselection of the associated encoder as the source encoder. These marked points in the stream are termed splice points. The MPEG standard defines two parameters to form a seamless splice point, a Splice Decode Delay (SDD), and a Maximum Splicepoint Rate (MSR). These parameters correspond to a given minimum decoder buffer size, such that, if the encoders conform to these parameters, the decoder buffer of this minimum buffer size is assured not to overflow. The minimum buffer size is specified to be greater than MSR*SDD. The SDD is the time between the splice time ($T_{sp}$) and the time of decoding ($T_D$) the first frame after the splice point. The MSR is the maximum transfer rate that an encoder may operate at the splice point, and for a period SDD after the splice point.

To allow for seamless switching among encoders, the end of a frame from a first source encoder must occur at the start of a frame from the newly selected second source encoder. For a given encoder-decoder system, having a constant encode-decode delay of $\Delta$, the required encode-to-splice delay E is thus seen to be equal to $\Delta$-SDD. To assure the appropriate encode-to-splice delay, the occupancy bounds of each encoder must be limited, so that the last bit of the frame just prior to the splice point, and the first bit of the frame just after the splice point, are switched at the appropriate time. As shown in copending U.S. patent application Ser. No. 08/829,124, in a constant bit rate system, with transfer rate R, the encoder occupancy at the time just prior to the encoding of the first frame after a splice point must be equal to the rate R times E. This is shown at 205 in FIG. 2b. Because the bits prior to the encoding of the last frame are unloaded from the buffer at the same rate R, in order to assure that the buffer occupancy is low enough to allow the occupancy to be at R*E at time Te, the frames prior to this splice point must be limited, as shown by the upper bound line segment 211 in FIG. 2b. That is, line segment 211 slopes at the rate $-R$, where R represents the rate at which the bits are unloaded from the encoder buffer. Because the frame just prior to the splice point must result in the occupancy R*E 205 at the splice point, and it is unloaded from the encoder buffer at a rate of R, it must have an occupancy which is equal to R*(F+E) 206, where F is the frame period, the time between the encoding of each frame.

Figure 2A:
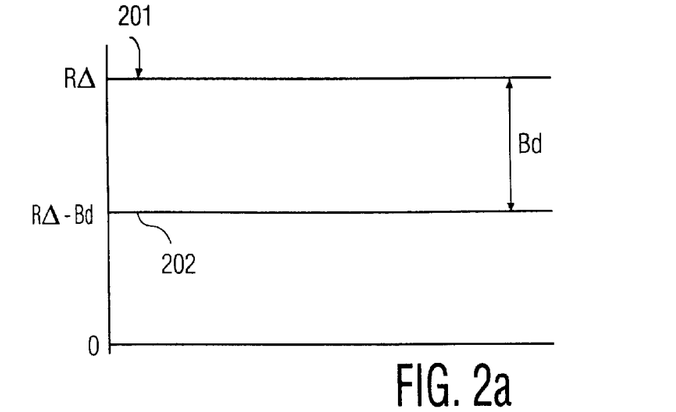
FIG. 2 shows the prior art encoder transfer rates and buffer occupancy bounds required so as to allow seamless splicing of a splice point in an MPEG stream without overflowing or underflowing the decoder buffer.
Figure 2B:
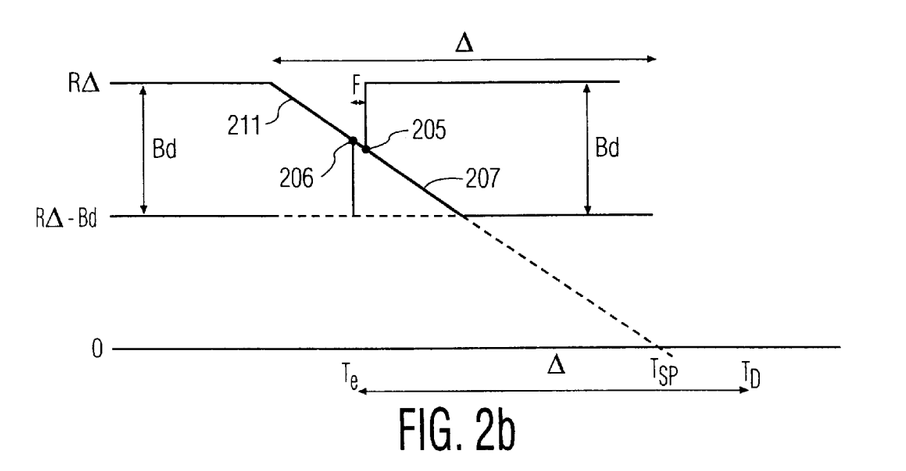

The encoder transfer rate is also the rate at which the decoder buffer is loaded. As discussed in the aforementioned copending U.S. patent application Ser. No. 08/829,124, the decoder buffer may contain residual frames from one encoder while receiving frames from another encoder at a different rate. To assure that the decoder buffer does not overflow, each encoder must conform to the aforementioned MPEG specification, and each encoder's buffer bounds must be adjusted to accommodate the fact that the other encoder may be operating at a different rate. If an encoder's rate is equal to the maximum allowed rate, MSR, no adjustment is necessary. If an encoder's rate is greater than MSR, then it must be decreased to conform to the MPEG specification, with the resultant decrease in the buffer bounds, consistent with equations 1 and 2, above, shown as line segment 221, 222, 223, and 224 in FIG. 2c. If an encoder's rate is less than MSR, then it must assume a possible increase to MSR, via the other encoder after the splice point, with the resultant increase in the bounds, consistent with equation 1 and 2, above, shown as line segment 231 and 232 in FIG. 2d. It should be noted that the line segment 211 shown in 2b is lower than segments 221 and 231 in FIGS. 2c and 2d, and thus line segment 211 forms the actual upper bound for the encoder occupancy.

Figure 2C:
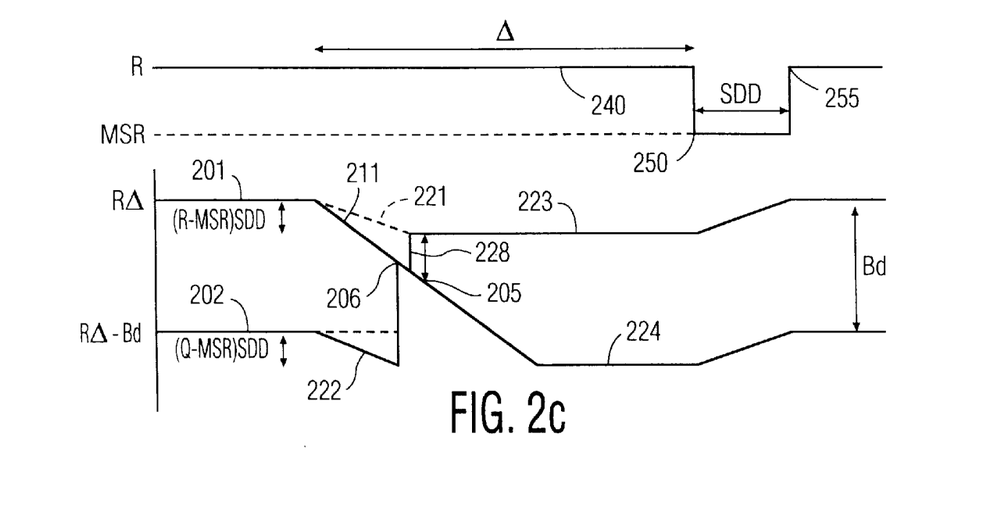
Figure 2D:
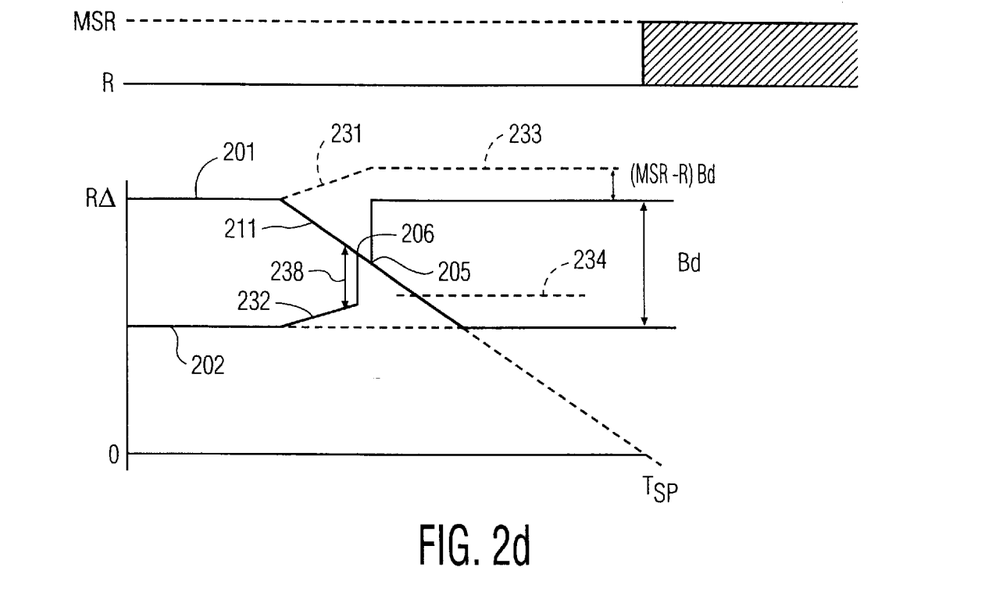
Figure 2E:
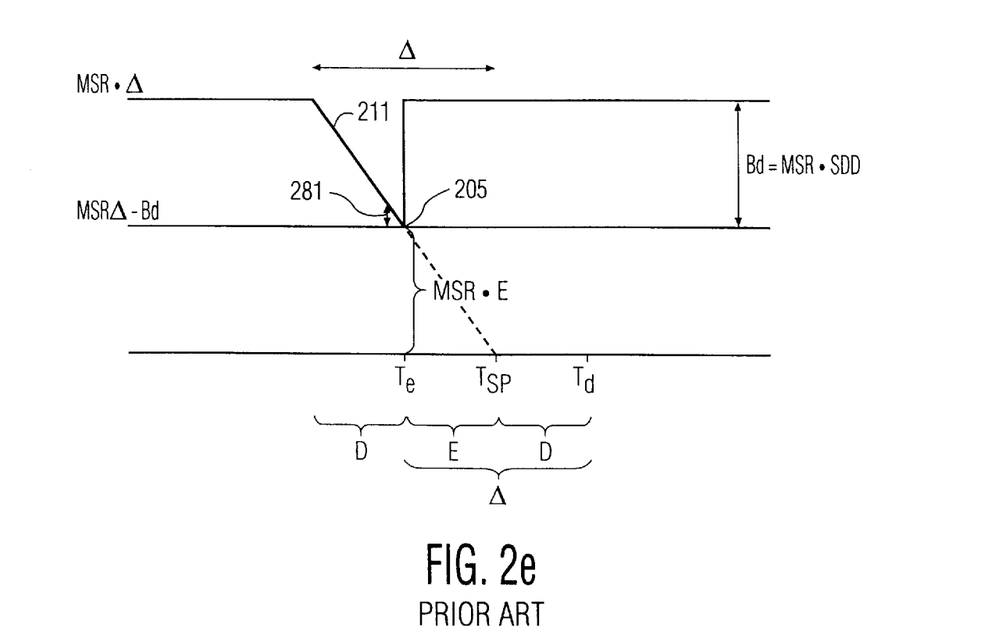

Conventionally, the MSR is selected in direct proportion to the minimum decoder buffer size, Bd, also specified by MPEG. To prevent buffer overflow, the MSR must be such that MSR*SDD<=Bd. To maximize the allowable transfer rate, MSR is selected such that. MSR*SDD=Bd. FIG. 2e shows the resultant encoder buffer bounds for an idealized MPEG splice point, wherein MSR*SDD=BD, and the encoder rate, R, is equal to this maximized MSR. As can be seen, in the idealized case, the upper bound 211 before the splice point is severely limiting; the upper bound after the splice point returns to its normal R*Delta limit, and the lower bound remains predominantly level.

Thus, as can be seen, the MPEG definition of seamless splice points necessitates a more stringent set of encoder occupancy bounds. Each time that the encoding of a frame must be modified, by zero-filling or truncation to conform to the lower or upper bounds respectively, an inefficiency and/or loss of quality will result. Truncating a frame to conform to an upper bound requires the elimination of detail in the encoded frame. Transmitting zero-filled frames reduces the overall information transfer rate, because the zero filling contains no information. It also has the potential of forcing a loss of quality when subsequent frames must be truncated because the available space in the buffer was consumed by these zero filled bits. The more stringent the bounds on occupancy, the higher the probability of having to incur this loss of efficiency and degraded image quality.

The MPEG definition of seamless splice points also forces a loss of efficiency at each splice point, whenever the specified MSR is lower than the encoder's nominal transfer rate R, by forcing the encoder to reduce its rate at the splice point for a period equal to SDD. This inefficiency may also introduce a loss of quality, because, with a lower transfer rate, the likelihood of having to truncate subsequent frames is increased.

Note that the inefficiencies and quality degradations discussed above will be incurred regardless of whether the stream is actually spliced at the identified splice points. For these reasons, it is expected that not all potentially useful splice points will be created as such, and the advantages and flexibilities which could be obtained by having highly splicable MPEG streams will not be achievable.

SUMMARY OF THE INVENTION

It is an object of this invention to minimize the information transfer inefficiency and loss of quality caused by the constraints placed on the encoder occupancy about a splice point, and to minimize the information transfer inefficiency caused by the transfer rate constraints about each splice point.

It is noted herein that splice points can be characterized as being Entry points, Exit points, or both entry and exit points. An Entry point is one at which the encoder stream can be switched into the stream to the decoder, that is, connected to the decoder. An Exit point is one at which the encoder stream can be switched out of the decoder stream, that is, disconnected from the decoder. Unless explicitly termed an Entry or Exit point, a splice point is defined herein to be unconstrained, allowing both entry and exit to and from the decoder stream at that point, consistent with the MPEG standard definition.

In accordance with this invention, it is shown herein that the characterization of splice points to be either Entry or Exit points can be formulated so as to minimize the information transfer inefficiency and loss of quality by a suitable adjustment of the bounds on encoder transfer rates and buffer occupancy bounds.

As disclosed herein, the prior art encoder buffer bounds can be relaxed for Entry-only and Exit-only points, in a variety of situations. Subject to the conditions disclosed herein, the encoder occupancy bounds about the splice point can be relaxed for Entry-only and Exit-only points, and rate reductions can be avoided for Exit-only points. The application of the less constraining bounds in accordance with this invention will result in a higher likelihood of improved information transfer efficiency and improved displayed image quality, while still adhering to the specified requirements of an MPEG seamless splice point.

Further, in accordance with this invention, optimizations in encoder buffer bounds and transfer rates can be achieved by suitably defining and utilizing splice point parameters, MSR and SDD, which are specific to each classification of splice points. That is, further optimizations can be achieved by utilizing an MSR-In value for Entry points and an MSR-Out value for Exit points, respectively.

Further, in accordance with this invention, optimizations in encoder buffer bounds and transfer rates can be achieved by providing buffer synchronization at the splicer.

DESCRIPTION OF THE PREFERRED EMBODIMENTS

Consider an MPEG encoding of a video scene, such as a sports event, which is to be transmitted over a television channel, such that at select points during the event, one or more commercials, also encoded in MPEG, may be inserted. The encoding may be in real time, or pre-recorded. Encoder 110 in FIG. 1 can be said to represent the sports event MPEG encoder, and encoder 120 represents the MPEG source of the commercials. The switch 140 is controlled by the provider of the television channel, and allows the provider to switch from the event to the commercial, and back again. The decoder 150 represents a system for receiving the resultant stream of MPEG frames, and providing the decoded frames to a display device, at the same rate that the frames were encoded from the video device. Note that the display device and video device are presented for illustrative purposes only. For example, the original source of the video images which are encoded into MPEG frames could be a computer graphics program, or a source of previously recorded images in either conventional analog video or MPEG format. The display device could be a transmitter of conventional video frames, such as an NTSC broadcast transmitter, or another encoder-decoder system wherein other commercials may be added.

In the encoding of the video frames in the sports event, select points will be identified as points wherein it would be appropriate to allow a commercial to be inserted, for example, after each completed play. At this point, the switch 140 can switch the source of a commercial 120 into the stream being provided to the decoder. Within the encoding of the commercial, there may be multiple points identified at which the switch 140 can be switched back to the source of the event, or to another source 130, such as the camera covering the sports announcer. For example, the commercial can be created to have splice points identified at 15 second, 30 second, and 60 second intervals, and, depending upon the time consumed between plays in the sports event, the provider of the service can disconnect from the commercial at any of the identified splice points. Note that each of the encoders can be operating at different transfer rates, as well as different frame rates, and the end-to-end encode to decode delay, delta, for each encoder may be different.

Conventional MPEG encoding of the splice points in each of these MPEG streams will require that at each of these splice points the encoder transfer rate not exceed the MPEG-specified MSR, and that the first frame after the splice point be scheduled to be decoded after a period SDD after the splice time, as discussed above. These constraints require that the encoder buffer occupancy conform to the bounds discussed above, and presented in FIG. 2. In particular, note that an encoder with a transfer rate which exceeds the specified MSR must reduce its transfer rate to the MSR at each splice point, and maintain it at this reduced rate for a time period SDD; and, an encoder with a transfer rate which is less than the specified MSR must increase the lower bound on its buffer occupancy at each splice point.

Exit-Only Splice Points

Consider, however, a splice point created at the end of each play in the sports event. This splice point can be identified as an Exit-only point, because one would not typically splice a sports event into the decoder stream immediately after the end of a play. In accordance with the invention presented herein, by classifying the splice point as an Exit-only point, the conventional MPEG related transfer rate and buffer bound constraints may be relaxed, thereby providing for improved efficiency and quality. Consider the conventional encoder transfer rate and buffer bounds shown in FIG. 2c, and repeated in FIG. 3, corresponding to the case wherein the encoder's nominal transfer rate R is higher than the MPEG-specified MSR, and the decoder buffer size Bd is sufficiently large to accommodate the use of this higher rate for the decode delay period; that is, Bd>=R*SDD. Because each MPEG source must adjust its bounds at a splice point in dependence upon the maximum rate that another source may be operated, as discussed above, a conventional MPEG compliant encoder must reduce its rate to MSR at each splice point, even though the decoder buffer may have a sufficient size to support the higher rate, R. That is, to conform to the MPEG specification, the encoder operating at a rate R 240 higher than the MSR must reduce its transfer rate to MSR, as shown at 250. After a time period SDD, it can resume its higher rate, as shown at 255. Consistent with equation 2, a reduction in rate necessarily requires a reduction in the upper and lower bounds of the encoder buffer occupancy, as shown at 221, 222, 223, and 224. The reduction in transfer rate necessitated by the MPEG specification results in a decrease in transfer efficiency, and a potential degradation in signal quality to accommodate this reduction. Note, for example, that immediately after the encoding of the last frame before the splice point 205, the maximum size 228 of the next frame will be significantly reduced because of the lowered upper bound 223.

Figure 3:
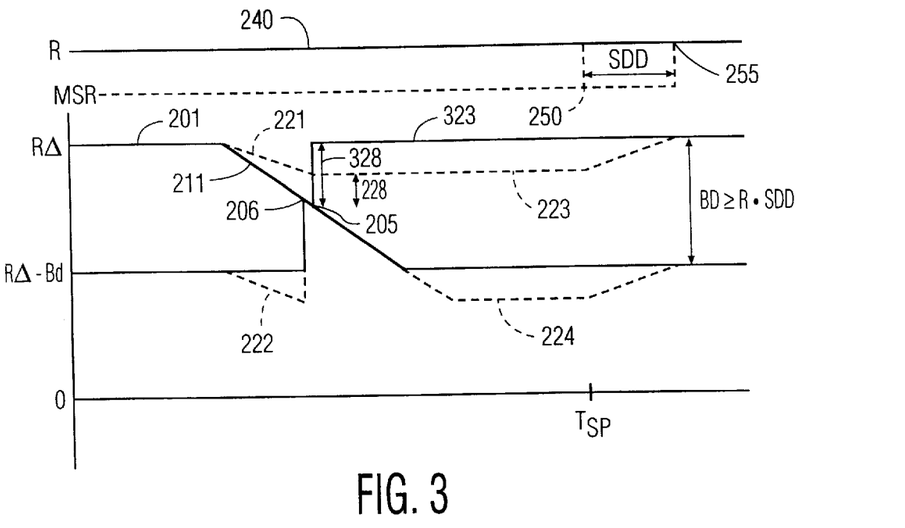
FIG. 3 shows the encoder transfer rates and buffer occupancy bounds required so as to allow seamless splicing of an Exit-only point in an MPEG stream without overflowing or underflowing the decoder buffer, in accordance with this invention.

If the splice point is an Exit-only splice point, only two alternatives are possible at the splice point: either the source will exit the decode-stream, or the source will remain in the decode stream. That is, the source will not enter the stream at this point. If a source with a rate higher than MSR exits the decode stream at the splice point, its high rate will have no effect on the stream from the other source. If the source with a rate higher than MSR remains in the decode stream at the splice point, it will, in effect, be merely continuing its constant rate transfer. That is, regardless of whether the source exits at an Exit-only splice point, it need not reduce its transfer rate, assuming, of course that the buffer is suitably sized (Bd>=R*SDD) to accommodate this higher rate. Because its rate does not decrease, its bounds are not reduced as in the prior art bounds 221–224. The required buffer bounds for an Exit-only splice point, in accordance with this invention, are shown in FIG. 3. For clarity, the conventional MPEG splice point transfer rate 250 and bounds 221–224 are shown in dashed lines, corresponding to those shown in FIG. 2c. Because the conventional MPEG stream must reduce its rate 250 at the splice point, the conventional MPEG stream encoder bounds 221–224 decrease in accordance with equations (1) and (2) above. As can be seen, although the upper bound of the encoder buffer occupancy is reduced, at 211, so as to assure that the last frame before the splice point exits the encoder buffer at the splice time, as in the case of the conventional MPEG splice point, the maximum size 328 of the first frame after the splice point 205 is significantly greater than that shown at 228 in FIG. 2c, because the encoder bounds after the splice point remain at R*Delta, as shown at 323. As can be seen at 240 in FIG. 3, the encoder in accordance with this invention retains its higher transfer rate throughout the splice time period, thereby retaining its transfer rate efficiency and maintaining a higher quality potential.

Entry-Only Splice Points

Consider next a recording of a sports event with splice points created for instant replay segments. The start of an instant replay segment can be characterized as an Entry-only splice point, because one would not typically disconnect the source from the decode stream at the start of such an event. In accordance with the invention presented herein, by classifying the splice point as an Entry-only point, the conventional MPEG related transfer rate and buffer bound constraints may be relaxed, thereby providing for improved efficiency and quality. Consider the conventional encoder transfer rate and buffer bounds shown in FIG. 4, corresponding to the case wherein the encoder's nominal transfer rate R 241 is lower than the MPEG-specified MSR, also shown in FIG. 2d. As discussed above, with respect to the prior art of FIG. 2d, because a conventional MPEG encoder must account for the possibility that another encoder may be operating at the higher MSR at the time of splicing, the lower bound of the encoder buffer must be increased 232 prior to the splice point 205.

Figure 4:
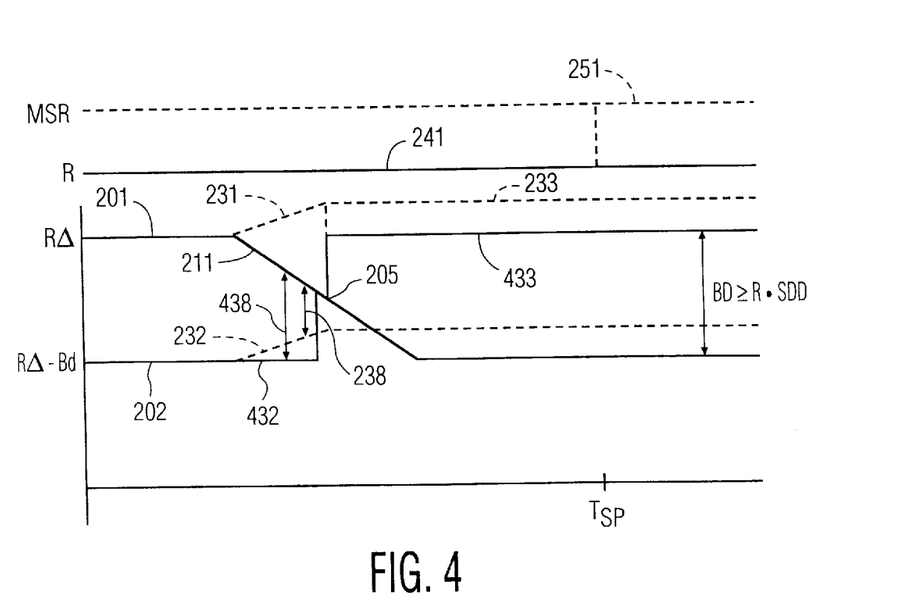
FIG. 4 shows the encoder transfer rates and buffer occupancy bounds required so as to allow seamless splicing of an Entry-only point in an MPEG stream without overflowing or underflowing the decoder buffer, in accordance with this invention.
Figure 5A:
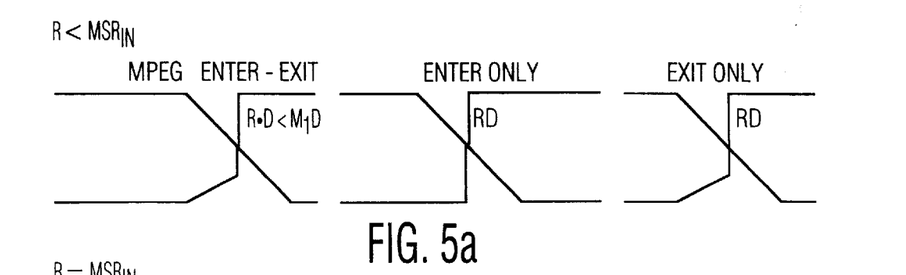
FIG. 5 shows the encoder transfer rates and buffer occupancy bounds required so as to allow seamless splicing of splice points in an MPEG stream, with splice parameters MSR-In and MSR-Out, in accordance with this invention.
Figure 5B:
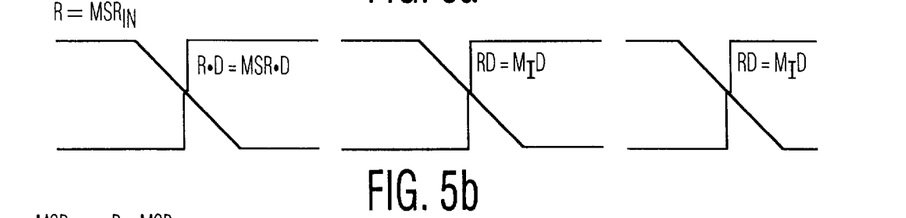
Figure 5C:
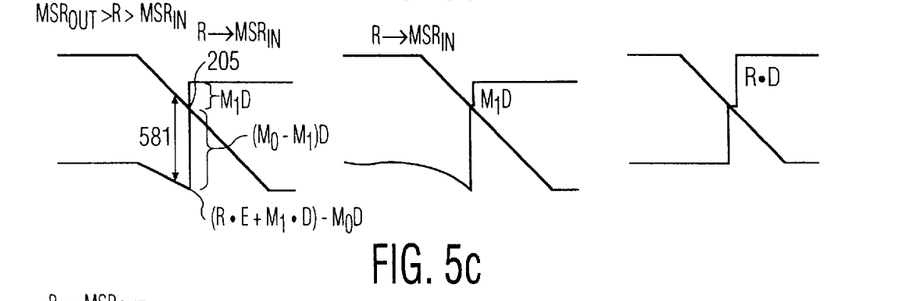
Figure 5D:
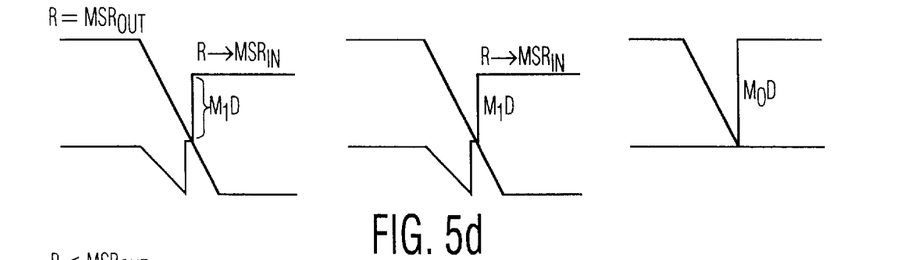
Figure 5E:
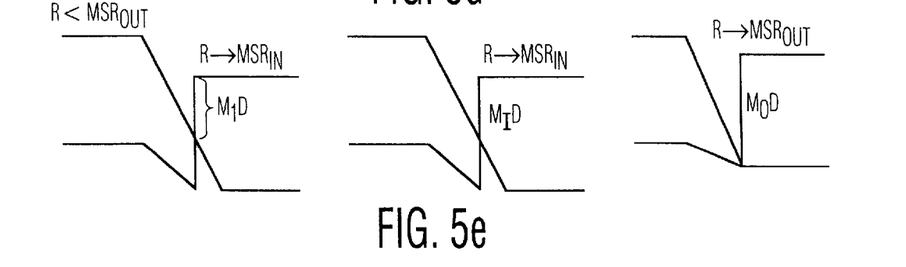

If the splice point is an Entry-only splice point, only two alternatives are possible at the splice point: either the source (with the entry point) will enter the decode-stream, or the source (already in the decode stream) will remain in the decode stream. That is, the source will not exit the stream at this point; alternatively stated, another source cannot enter at this splice point. Because a source with a rate higher than this encoder's rate cannot enter the decode stream at the splice point, its higher rate can have no effect on the stream from this encoder. If the encoder with the lower rate remains in the decode stream at the splice point, it will, in effect, be merely continuing its constant rate transfer. That is, regardless of whether the source newly enters the decode stream at an Entry-only splice point, or it merely continues within the decode stream, it need not adjust its lower bound to accommodate a higher rate source. In accordance with this invention, the lower bound 432 of an encoder buffer need not be raised prior to the splice point. By maintaining the lower bound as shown at 432, the potential size 438 of the frames prior to the splice point can be larger than the potential size 238 resulting from a conventional MPEG encoding in the region of a splice point, thereby allowing for improved picture quality.

MSR-In, MSR-Out Parameters

The MPEG specification refers to a single value as an Maximum Splice Rate (MSR) parameter. To maximize the allowable transfer rate, the conventional MSR has been specified such that MSR*SDD=Bdm. As shown in FIGS. 2c and 2d, an encoder with a transfer rate R which differs from MSR will be forced to adjust its bounds and/or rate to accommodate the possibility that another encoder may be operating at this MSR.

As discussed above, the transfer rate and bounds of Entry-only and Exit-only splice points need not conform to the constraints imposed on conventional MPEG splice points. The Exit-only splice point is not constrained by the specified minimum decoder buffer size, Bdm. As discussed above, this buffer size must be such that Bd>=R*SDD. Alternatively stated, the transfer rate of an encoder which may exit the decoder stream at a splice point must be less than or equal to Bd/SDD. That is the maximum splice rate at an exit from the decoder, herein termed MSR-Out, is equal to Bd/SDD. If an encoder's transfer rate at an Exit-only splice point is less than or equal to MSR-Out, the encoder need not reduce its rate to the conventional MPEG MSR rate. In a similar manner, it is seen that the convention MPEG MSR rate need only apply to an encoder which may enter the decoder stream at the splice point. As contrast to the MSR-Out rate, an MSR-In rate can be defined to be the maximum splice rate at an entry to the decoder stream. This MSR-In rate could be, for example, a commonly used communications rate, such as the digital TV ATSC broadcast services standard rates of 19.4 Mb/s or 38.8 Mb/s, which are defined independent of the MPEG specified decoder buffer size. Specifying an MSR-Out rate which is dependent upon the buffer size, and a lower MSR-In rate which is common, places minimal restrictions on encoders operating at the common rate, while allowing higher speed encoders less stringent bounds at Exit-only splice points. A splice point which may be either an entry point or an exit point, that is, a conventional MPEG splice point, must conform to the minimum of these two specified MSR values, which will typically be the MSR-In value.

By defining an MSR-In and MSR-Out set of parameters, the encoder buffer bounds will be as shown in FIG. 5, as a function of the encoder transfer rate relative to these parameters, and as a function of whether the splice point is an Entry point, an Exit point, or an entry-exit point. Note that the upper limit of the encoder occupancy at the splice point, relative to the occupancy immediately prior to the splice point, determines the maximum size of the frame immediately after the splice point. As can be seen, for Entry and entry-exit points, the MSR-In determines the maximum frame size, because the span of the occupancy at the splice point is equal to MSR-In*SDD. For an Exit-only point, the maximum frame size immediately after the splice point is determined by MSR-Out. Note also that in contrast to the idealized MPEG splice point encoder bounds shown in FIG. 2e, wherein the encoder rate equals the singular MSR rate, by specifying alternative MSRs, the encoder occupancy lower bounds can be adjusted in dependence upon the relationship between MSR-In and MSR-Out. For example, in FIG. 2e, the maximum size 281 of each frame prior to the splice point 205 is equal to the transfer rate times the number of frame intervals before the splice point; thus, the frames immediately prior to a splice point will contain minimal information. Conversely, in FIG. 5c, it is seen that the size 581 of the frames prior to the splice point 205 are proportional to the difference between the MSR-In and MSR-Out rates. Thus, the MSR-In and MSR-Out rates can be selected so as to allocate these maximum sizes of frames. For example, based upon the perceived need for large frames after the splice point, as compared to the size of the frames before the splice, the encoder buffer occupancy bounds can be optimized for allowing for suitably sized frames before and after the splice point, by an appropriate determination of MSR-In, relative to MSR-Out.

The foregoing merely illustrates the principles of the invention. It will thus be appreciated that those skilled in the art will be able to devise various arrangements which, although not explicitly described or shown herein, embody the principles of the invention and are thus within its spirit and scope.

I claim:

1. An encoder for encoding frames for communication to a decoder, said decoder having an associated minimum decoder buffer size, and means for removing each of said frames from said decoder at a specified decode time, said communication at option being effected via a switch which at option connects or disconnects said encoder to and from said decoder, said encoder comprising:
an encoder buffer able to contain said frames, said frames comprised of data elements, the total amount of data elements within the buffer being termed the occupancy of the encoder buffer,
means for transferring the data elements from the encoder buffer to the decoder at a transfer rate, thereby reducing the occupancy of the encoder buffer at the transfer rate,
means for regulating the occupancy of said encoder buffer to be within a lower occupancy bound and a higher occupancy bound, and
means for identifying splice points between said frames, said splice points being characterized as entry-points, exit-points, or entry-exit points, wherein:
said entry-point identifies a point at which the switch may connect the encoder to the decoder;
said exit-point identifies a point at which the switch may disconnect the encoder from the decoder;
said entry-exit point identifies a point at which the switch may connect or disconnect the encoder to and from the decoder;
said splice points and encoder buffer occupancy being such that if the switch connects or disconnects the encoder to and from the decoder at the splice point, the number of data elements in the decoder will not exceed the minimum decoder buffer size, and all the data elements associated with each frame will have been communicated to the decoder at the specified decode time of each frame,
characterized in that:
the lower occupancy bound is increased relative to MPEG lower occupancy bound for frames prior to an exit-only splice point and an entry-exit splice point, and not increased for frames prior to an entry-only splice point.

2. An encoder as claimed in claim 1, wherein said increase of said lower occupancy bound is dependent upon the difference between a maximum splice rate (MSR) and the transfer rate, said nominal splice rate being greater than the transfer rate.

3. An encoder as claimed in claim 1, wherein said frames are MPEG video frames.

4. An encoder as claimed in claim 2, wherein:
said frames are MPEG video frames.

5. An encoder as claimed in claim 2, wherein said maximum splice rate is 19.4 Mbit/sec.

6. An encoder as claimed in claim 2, wherein said maximum splice rate is 38.8 Mbit/sec.

7. An encoder for encoding frames for communication to a decoder, said decoder having an associated minimum decoder buffer size, and means for removing each of said frames from said decoder at a specified decode time, said communication at option being effected via a switch which at option connects or disconnects said encoder to and from said decoder, said encoder comprising:
an encoder buffer able to contain said frames, said frames comprised of data elements, the total amount of data elements within the buffer being termed the occupancy of the encoder buffer,
means for transferring the data elements from the buffer to the decoder at a transfer rate, thereby reducing the occupancy of the buffer at the transfer rate,
means for regulating the occupancy of said encoder buffer to be within a lower occupancy bound and a higher occupancy bound, and
means for identifying splice points between said frames, said splice points being characterized as entry-points, exit-points, or entry-exit points, wherein:
said entry-point identifies a point at which the switch may connect the encoder to the decoder;
said exit-point identifies a point at which the switch may disconnect the encoder from the decoder;
said entry-exit point identifies a point at which the switch may connect or disconnect the encoder to and from the decoder;
said splice points and encoder buffer occupancy being such that if the switch connects or disconnects the encoder to and from the decoder at the splice point, the number of data elements in the decoder will not exceed the minimum decoder buffer size, and all the data elements associated with each frame will have been communicated to the decoder at the specified decode time of each frame,
characterized in that:
the lower occupancy bound is decreased relative to a MPEG lower occupancy bound for frames prior to an entry-only splice point and an entry-exit splice point, and not decreased for frames prior to an exit-only splice point.

8. An encoder as claimed in claim 7, wherein said decrease of said lower occupancy bound is dependent upon the difference between the transfer rate and a maximum splice rate (MSR), said nominal splice rate being less than the transfer rate.

9. An encoder as claimed in claim 7, wherein said frames are MPEG video frames.

10. An encoder as claimed in claim 8, wherein:
said frames are MPEG video frames.

11. An encoder for encoding frames for communication to a decoder, said decoder having an associated minimum decoder buffer size, and means for removing each of said frames from said decoder at a specified decode time, said communication at option being effected via a switch which at option connects or disconnects said encoder to and from said decoder, said encoder comprising:
an encoder buffer able to contain said frames, said frames comprised of data elements, the total amount of data elements within the buffer being termed the occupancy of the encoder buffer, means for transferring the data elements from the buffer to the decoder at a transfer rate, thereby reducing the occupancy of the buffer at the transfer rate, means for regulating the occupancy of said encoder buffer to be within a lower occupancy bound and a higher occupancy bound, and means for identifying splice points between said frames, said splice points being characterized as entry-points, exit-points, or entry-exit points, wherein:

said entry-point identifies a point at which the switch may connect the encoder to the decoder;

said exit-point identifies a point at which the switch may disconnect the encoder from the decoder;

said entry-exit point identifies a point at which the switch may connect or disconnect the encoder to and from the decoder;

said splice points and encoder buffer occupancy being such that if the switch connects or disconnects the encoder to and from the decoder at the splice point, the number of data elements in the decoder will not exceed the minimum decoder buffer size, and all the data elements associated with each frame will have been communicated to the decoder at the specified decode time of each frame, characterized in that:

the lower occupancy bound is decreased relative to a MPEG lower occupancy bound for frames after an entry-only splice point and an entry-exit splice point, and not decreased for frames prior to an exit-only splice point.

12. An encoder as claimed in claim 11, wherein said decrease of said lower occupancy bound is dependent upon the difference between the transfer rate and a maximum splice rate (MSR), said nominal splice rate being less than the transfer rate.

13. An encoder as claimed in claim 11, wherein said frames are MPEG video frames.

14. An encoder as claimed in claim 12, wherein:

said frames are MPEG video frames.

* * * * *